W. H. FOYE.
Double-Acting Reversible Gang-Plow.
No. 220,367. Patented Oct. 7, 1879.
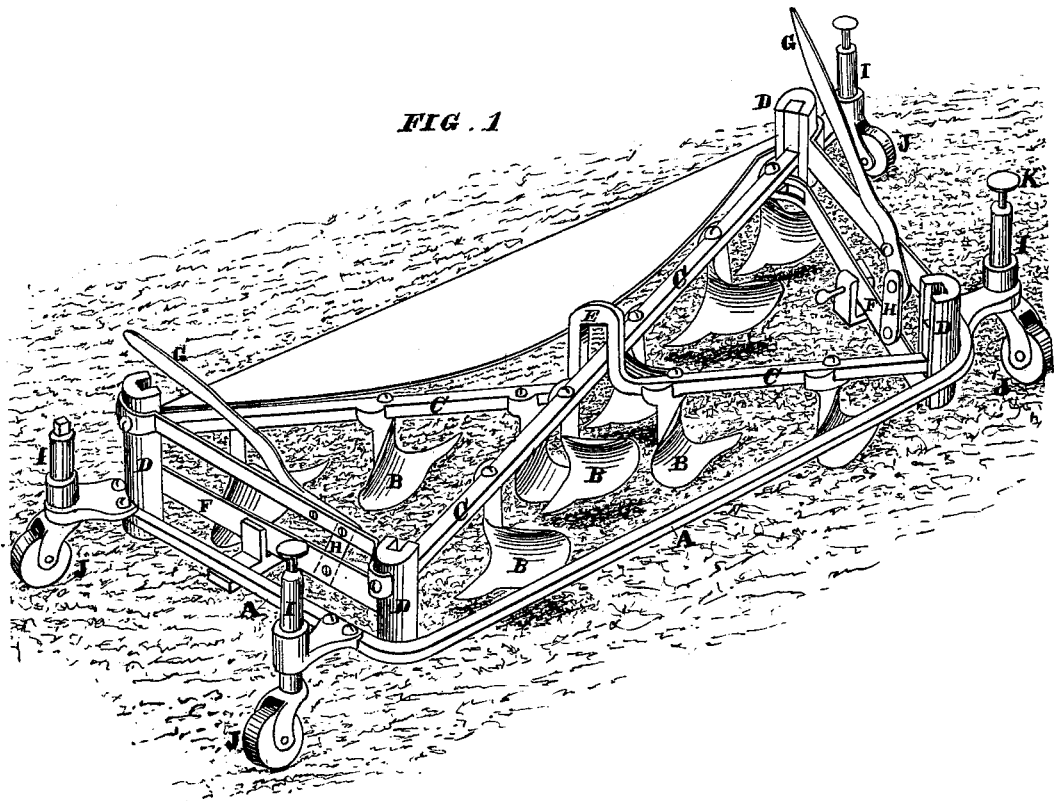
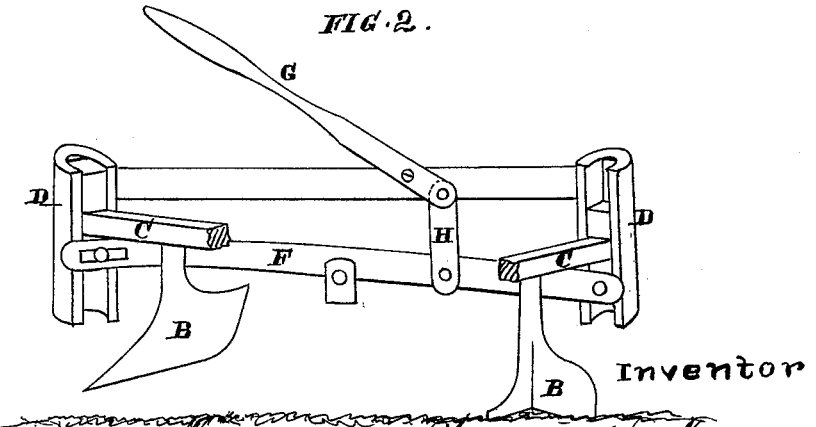
Witnesses
Geo. H. Strong.
Frank A. Brooks.
Inventor
William H. Foye
By Dewey & Co. Attys
N. PETERS, PHOTO-LITHOGRAPHER, WASHINGTON, D. C.

UNITED STATES PATENT OFFICE.

WILLIAM H. FOYE, OF SAN FRANCISCO, CALIFORNIA.

IMPROVEMENT IN DOUBLE-ACTING REVERSIBLE GANG-PLOWS.

Specification forming part of Letters Patent No. 220,367, dated October 7, 1879; application filed April 29, 1879.

*To all whom it may concern:*

Be it known that I, WILLIAM H. FOYE, of the city and county of San Francisco, and State of California, have invented an Improved Double-Acting Reversible Gang-Plow; and I hereby declare the following to be a full, clear, and exact description thereof.

My invention relates to certain improvements in gang-plows of that class which are hauled across the field to be plowed by means of engines placed at one or both sides of the field, with suitable anchors and connecting and operating ropes.

My improvements consist in mounting two gangs of plows upon a frame in lines which cross each other diagonally within the frame, one gang standing so as to plow in one direction, while the other gang is mounted so that it will plow in the opposite direction. These two oppositely-acting gangs of plows are provided with mechanism by which one or both of them may be raised from the ground, and the frame is mounted upon a series of adjustable bearing-wheels, three of which travel all the time upon solid ground.

Referring to the accompanying drawings for a more complete explanation of my invention, Figure 1 is a perspective view of my apparatus. Fig. 2 is a transverse section of one end, showing the method of raising and lowering the plows.

A is a frame of suitable dimensions to receive a gang of plows of any desired number. In the present case I have shown each gang as containing five; but any other number might be used. These plows B are mounted upon plow-beams C, which extend diagonally from one corner to the other of the frame, as shown.

In each corner of the frame is a vertical slotted guide, D, in which the ends of the plow-beams are guided. Each plow-beam has a suitable cross head or slide upon its ends to steady the beams in the guides, and the operating-levers may be connected with these projections.

Two oppositely-placed gangs of plows are mounted in this frame, one set being let down into the ground, while the other set is elevated so as not to work. By this method it will be seen that the machine may be drawn from one side of the field to the other, plowing in each direction without being turned around.

As the two plow-beams cross each other diagonally near the center of the frame, I form one of them with a yoke or curve, E, in it, so that it will arch above the other beam, and thus provide sufficient space for the two beams to move up and down without interfering with each other.

In order to raise and lower these beams and plows, I employ a double lever, F, which is hinged or pivoted at or near its center, as shown. Above this lever is the hand-lever G, which has its fulcrum in the frame, and is connected with the lever F by a link, H, or in other suitable manner.

The lever F has each end pivoted or united to the slide of the beams C, one end being connected with the end of one beam while the other is connected with the other beam. It will thus be seen that by the simple action of the double lever the ends of both beams are acted upon simultaneously, one being thrown up and the other down. At the opposite end of the frame a similar combination of levers actuates the other ends of these beams, so that one beam may be thrown up and its plows taken out of the ground, while the other beam will be thrown down so that its plows will enter the ground; or both beams may be so placed that neither gang will touch the ground, and in this condition the machine may be moved to any point desired.

At or near each of the four corners of the machine are mounted hollow posts I, within which the spindles or stems of the caster-wheels J J' are supported and turn. The two wheels J run upon the solid ground all of the time, and consequently need no adjustment; but the wheels J' are alternately furrow-wheels, and they are, therefore, provided with screws or other suitable devices K, whereby they may be adjusted to either run upon the solid ground or in the furrow, as the direction of the machine may require. The machine is thus actually supported upon three wheels, which run upon the solid ground, while the fourth wheel, running in the furrow, has but little to do.

When the plow is running in either direction the wheels in front and in the rear, which are in line with the plow-beam then at work, will take the principal part of the strain, running upon the solid ground, and the other front wheel will also run upon solid ground, so that the plow always has a firm and steady support.

The operation of my plow will then be as follows: The engines by which the plows are hauled across the field are placed opposite each other, and the traction-rope passing around the drums by which it is actuated, is attached to one end of the plow-frame. The gang of plows which are to work are lowered to take the ground while the others are raised, and the apparatus is started across the field. When the end of the furrow is reached the plows which have been at work are raised out of the ground and the other gang are depressed so as to take the ground. The traction-ropes are changed so that the opposite engine may pull the plow back again, and the wheels J' J' adjusted so that the wheel which was the furrow-wheel during the last cut will become a leader upon solid ground during the return cut, and the other wheel will become a furrow-wheel.

The engines are moved forward as far as may be necessary for each cut or furrow, and the plow is easily moved for the same purpose at the end of each cut.

Having thus described my invention, what I claim as new, and desire to secure by Letters Patent, is—

1. The plow-beams C, crossing each other diagonally within the frame A and having secured to them the oppositely-placed gangs of plows B, with an operating mechanism, whereby one gang may be elevated and the other depressed, substantially as herein described.

2. The plow-beams C, crossing each other diagonally and carrying the plows B, one of said beams having the arch or yoke E, whereby one beam may be raised and the other depressed simultaneously, substantially as herein described.

3. The plow-beams C, crossing each other diagonally and carrying the plows B, as shown, in combination with the frame A and the guides D, substantially as and for the purpose herein described.

4. The plow-beams C, crossing each other diagonally and having their ends fitted to move in the guides D, in combination with the levers F and G, or an equivalent device, whereby the beams may be moved in opposite directions simultaneously, substantially as herein described.

5. In a gang-plow, plow-beams crossing each other diagonally, each beam carrying plows set in a direction opposite to those on the other beam, in combination with a frame in which the said beams are supported and are vertically adjustable, as set forth.

In witness whereof I have hereunto set my hand.

WILLIAM H. FOYE.

Witnesses:
GEO. H. STRONG,
FRANK A. BROOKS.